United States Patent
Lee et al.

(10) Patent No.: US 12,287,736 B2
(45) Date of Patent: Apr. 29, 2025

(54) STORAGE DEVICE FOR COLLECTING OPTIMAL DEBUGGING DATA AND SYSTEM INCLUDING THE STORAGE DEVICE

(71) Applicant: SK hynix Inc., Gyeonggi-do (KR)

(72) Inventors: Seon Ju Lee, Gyeonggi-do (KR); Geon Woo Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 28 days.

(21) Appl. No.: 18/337,052

(22) Filed: Jun. 19, 2023

(65) Prior Publication Data
US 2024/0232082 A1    Jul. 11, 2024

(30) Foreign Application Priority Data
Jan. 10, 2023 (KR) ............ 10-2023-0003665

(51) Int. Cl.
*G06F 12/0811* (2016.01)
*G06F 12/0875* (2016.01)

(52) U.S. Cl.
CPC ...... *G06F 12/0811* (2013.01); *G06F 12/0875* (2013.01); *G06F 2212/1016* (2013.01)

(58) Field of Classification Search
None
See application file for complete search history.

(56) References Cited

U.S. PATENT DOCUMENTS

| | | | |
|---|---|---|---|
| 2018/0217910 A1* | 8/2018 | Yang | G06F 11/3006 |
| 2020/0117389 A1* | 4/2020 | Kang | G06F 3/0656 |
| 2022/0365710 A1* | 11/2022 | Golov | G06F 11/3075 |
| 2023/0409231 A1* | 12/2023 | Gaskill | G06F 3/0604 |
| 2024/0201866 A1* | 6/2024 | Shono | G06F 3/0656 |

* cited by examiner

*Primary Examiner* — Prasith Thammavong
*Assistant Examiner* — Edmund H Kwong
(74) *Attorney, Agent, or Firm* — IP & T GROUP LLP

(57) ABSTRACT

The present disclosure relates to a storage device that optimally maintains a size of debugging data. Disclosed is a memory controller, including a first interface may communicate with a first external device; a second interface may generate a signal for controlling an operation of a second external device; a first volatile memory buffer; and a processor may generate and store the telemetry log data in the first volatile memory buffer; move and store the telemetry log data stored in the first volatile memory buffer to a first non-volatile memory buffer, when a size of the telemetry log data stored in the first volatile memory buffer is greater than or equal to a threshold size; and set the threshold size based on at least one among a number of telemetry logs stored in the first volatile memory buffer and a rising momentum of the number of the telemetry logs.

17 Claims, 5 Drawing Sheets

STORAGE DEVICE FOR COLLECTING OPTIMAL DEBUGGING DATA AND SYSTEM INCLUDING THE STORAGE DEVICE

CROSS-REFERENCE TO RELATED APPLICATIONS

The present application claims the benefit of priority under 35 U.S.C. § 119(a) to Korea Patent Application No. 10-2023-0003665, filed Jan. 10, 2023, the entire contents of which are incorporated herein by reference for all purposes.

FIELD

Various embodiments of the present disclosure relate to a storage device that optimally maintains the size of debugging data being collected and a method of operating the storage device.

BACKGROUND

A storage device is a device capable of storing data based on a request from an external device such as a computer, a mobile terminal such as a smart phone or tablet, or various electronic devices.

The storage device may include a memory and a memory controller configured to control the memory. The memory controller may receive a command from an external device. Based on the received command, the memory controller may read data from the memory, write/program data into the memory, store data in the memory, or execute or control operations for erasing data in the memory.

The storage device may store log data in various forms. For example, when an error event occurs, the storage device may store error log data, and may also maintain log data including general state information of the storage device.

Since the storage device has a telemetry function, when an event such as a failure occurs in the storage device, the storage device may store telemetry log data. Debugging the cause of the event can be made possible by remotely obtaining the telemetry log data. The data collected through the telemetry function may be different for each manufacturer. Whether the cause of the event can be easily found can be determined depending on which data is collected when an event occurs.

In order to easily find the cause of the event, log data before and after the event occurred must be saved. If too little log data is stored, data related to the cause of the event may not be saved. If too much log data is stored, the efficiency of a buffer deteriorates and it may take a lot of time to analyze the cause of the event.

SUMMARY

Various embodiments of the present disclosure may provide a storage device and a buffer structure in the storage device that dynamically determines an optimal size of log data to be stored in the storage device.

The technical concern to be solved by the present disclosure is not limited to the above-mentioned technical concern, and other technical concerns that are not mentioned will be clearly understood by ordinary-skilled persons in the art to which the present disclosure pertains from the following description.

One embodiment of the present disclosure is a memory controller 120, including: a first interface (e.g. a host interface 121) configured to perform data communication with a first external device (e.g. host 150); a second interface (e.g. a memory interface 122) configured to generate a signal for controlling an operation of a second external device (e.g. memory 110); a first volatile memory buffer (e.g. part of a working memory 125) configured to store telemetry log data; and a processor 124 configured to generate and store the telemetry log data in the first volatile memory buffer; move and store the telemetry log data stored in the first volatile memory buffer to a first non-volatile memory buffer, when a size of the telemetry log data stored in the first volatile memory buffer is greater than or equal to a threshold size; and set the threshold size based on at least one among a number of the telemetry logs stored in the first volatile memory buffer and a rising momentum of the number of the telemetry logs.

Another embodiment of the present disclosure is a storage device 100, including: a memory 110 including a non-volatile memory and configured to store data; and a memory controller 120 configured to generate a control signal for controlling the memory to write data in or read data from the memory, and the memory controller 120 may include: a first volatile memory buffer (e.g. part of a working memory 125) configured to store telemetry log data; and a processor 124 configured to generate and store the telemetry log data in the first volatile memory buffer; move and store the telemetry log data stored in the first volatile memory buffer to a first non-volatile memory buffer, when a size of the telemetry log data stored the first volatile memory buffer is greater than or equal to a threshold size; set the threshold size based on at least one among a number of telemetry logs stored in the first volatile memory buffer and a rising momentum of a number of telemetry logs.

Another embodiment of the present disclosure is a storage device 100, including: a memory 110 including a non-volatile memory; and a memory controller 120 including a volatile memory and a processor configured to control the memory to write data in the memory or read the data from the memory, and the processor 124 configured to determine whether an event occurs that requires storing telemetry log data; when it is determined that the event occurred, generate the telemetry log data and store the telemetry log data in the volatile buffer; determine whether a size of the stored telemetry log data exceeds a threshold size; and when it is determined that the size of the stored telemetry log data exceeds the threshold size, flush the stored telemetry log data to the non-volatile buffer, wherein the threshold size is determined based on a size of the volatile memory, a maximum number of telemetry logs capable of storing in the volatile memory, and a number of the telemetry logs stored in the volatile buffer for a first time period.

According to various embodiments of the present disclosure, debugging can be facilitated by storing optimal telemetry log data and delivering it to an external device during debugging.

DETAILED DESCRIPTION

Hereinafter, various embodiments of the present disclosure will be described in further detail with reference to the accompanying drawings.

Figure 1:
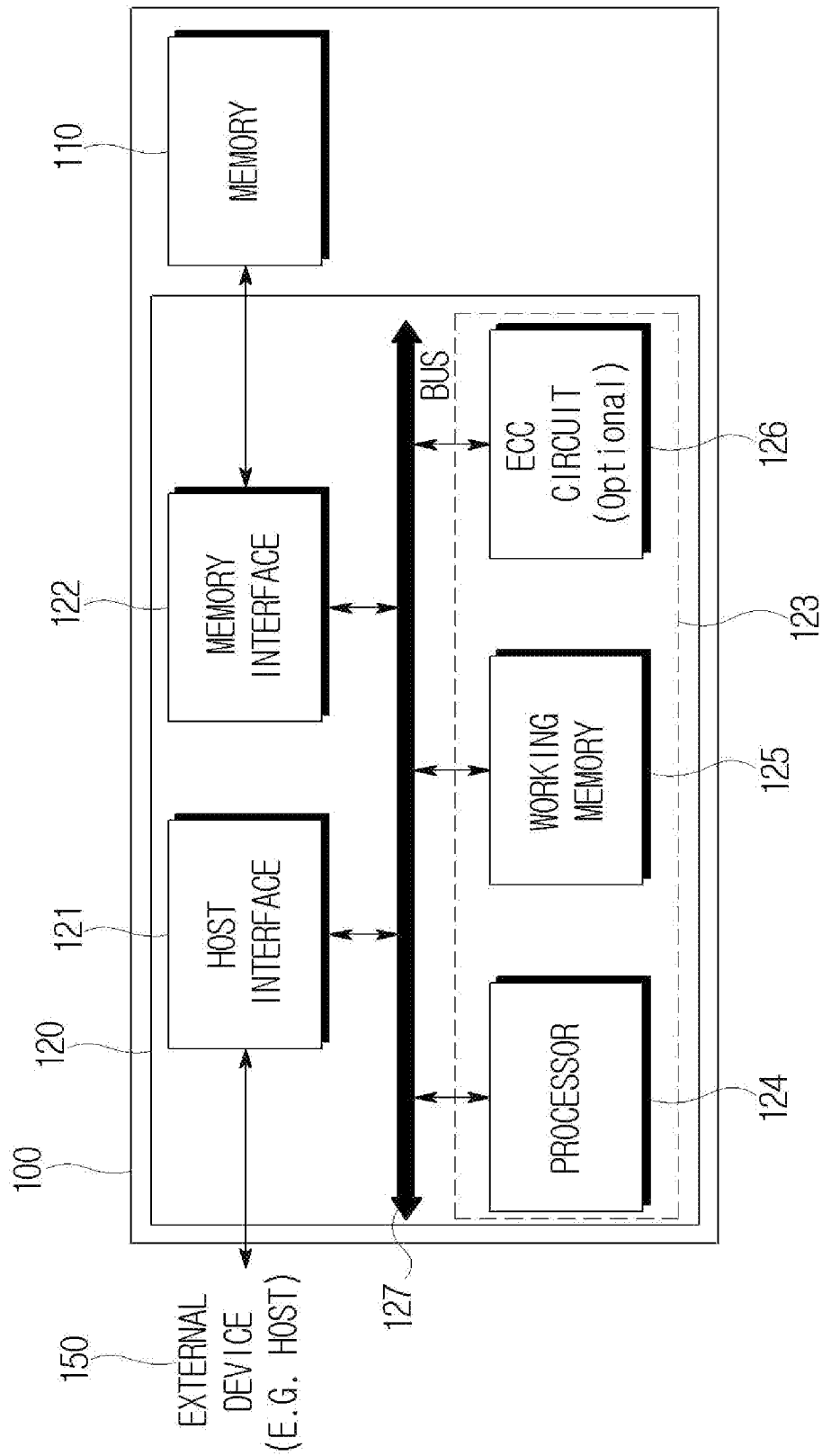
FIG. 1 is a schematic configuration diagram of a storage device according to embodiments of the present disclosure.

FIG. 1 is a schematic configuration diagram of a storage device according to embodiments of the present disclosure.

Referring to FIG. 1, a storage device 100 according to embodiments of the present disclosure may include a memory 110 that stores data and a controller 120 that controls the memory 110. In an embodiment, additional components may be further included in the storage device 100.

The memory d110 includes a plurality of memory blocks and operates in response to control of the controller 120. In an embodiment, the memory 110 may perform operations that include, for example, a read operation, a program operation (also referred to as "write operation"), and an erase operation.

For example, the memory d110 may be various types of a non-volatile memory, such as a NAND flash memory, 3D NAND flash memory, a NOR flash memory, resistive random-access memory (RRAM), a phase-change memory (PRAM), magnetoresistive random access memory (MRAM), a ferroelectric random access memory (FRAM), or a spin transfer torque random access memory (STT-RAM) and the like.

The memory 110 may be implemented as a three-dimensional array structure. Embodiments of the present disclosure may be applied not only to a flash memory in which a charge storage layer is formed of a conductive floating gate, but also to a charge trap type flash (CTF) in which a charge storage layer is formed of an insulating film.

The memory 110 may receive commands and addresses from the controller 120 (also may be referred to as a memory controller), and may access a region selected by an address among the memory cell arrays. That is, the memory 110 may perform an operation indicated by a command with respect to a region selected by an address.

For example, the memory 110 may perform a program operation, a read operation, an erase operation, and the like. During a program operation, the memory 110 may program data into a region selected by an address. During a read operation, the memory 110 may read data from a region selected by an address. During an erase operation, the memory 110 may erase data stored in a region selected by an address.

The controller 120 may control program (write), read, erase, and background operations on the memory 110. In an embodiment, the background operation may include one or more among garbage collection (GC), wear leveling (WL), read reclaim (RR), and bad block management (BBM) operations.

The controller 120 may control the operation of the memory 110 according to a request of an external device (e.g., a host) located outside the storage device 100. In some embodiments, the controller 120 may control the operation of the memory 110 regardless of a request of an external device.

An external device may be a computer, a Ultra Mobile PC (UMPC), a workstation, Personal Digital Assistant (PDA), a tablet, a mobile phone, a smart phone, an e-book, a portable multimedia player (PMP), a portable game machine, a navigation device, a black box, a digital camera, a Digital Multimedia Broadcasting (DMB) player, a smart television, a digital audio recorder, a digital audio player, a digital picture recorder, a digital picture player, a digital video recorder, a digital video player, a storage constituting a data center, one of various electronic devices constituting a home network, one of various electronic devices constituting a computer network, one of various electronic devices constituting a telematics network, a radio frequency identification (RFID) device, and a mobile device (e.g. vehicle, robot, drone) that travels on the ground, water or air under human control or autonomously travels.

The external device may include at least one operating system (OS). The operating system may generally manage and control functions and operations of an external device, and provide mutual operations between the external device and the storage device 100. The operating system may be divided into a general operating system and a mobile operating system according to the mobility of an external device.

The controller 120 and an external device may be separate devices. In some cases, the controller 120 and an external device may be implemented as an integrated device. Hereinafter, for convenience of description, an example in which the controller 120 and an external device are separate devices will be described.

Referring to FIG. 1, the controller 120 may include a host interface 121, a memory interface 122, and a control circuit 123.

The host interface 121 provides an interface for communication with an external device. For example, the host interface 121 may provide an interface that uses at least one among various communication standards or interfaces such as a Universal Serial Bus (USB) protocol, a multimedia card (MMC) protocol, a peripheral component interconnection (PCI) protocol, a PCI-express (PCI-e or PCIe) protocol, an Advanced Technology Attachment (ATA) protocol, a Serial-ATA protocol, a Parallel-ATA protocol, a small computer small interface (SCSI) protocol, an enhanced small disk interface (ESDI) protocol, an Integrated Drive Electronics (IDE) protocol, a system management bus (SMBus) protocol, an inter-integrated circuit (I2C) protocol, an improved inter-integrated circuit (I3C) protocol, a proprietary protocol, and the like.

The control circuit 123 may receive a command through the host interface 121 and may perform an operation of processing the received command.

The memory interface 122 may be connected to the memory 110 to provide an interface for communication with the memory 110. That is, the memory interface 122 may be configured to provide an interface between the memory 110 and the controller 120 in response to a control of the control circuit 123.

The control circuit 123 may control an operation of the memory 110 by performing overall control of the controller 120. To this end, according to the embodiment, the control circuit 123 may include a processor 124, and further include a working memory 125 and/or an error detection and correction circuit (ECC Circuit) 126 optionally.

The processor 124 may control operations of the controller 120.

The processor 124 may communicate with an external device through the host interface 121 and may communicate with the memory 110 through the memory interface 122.

The processor 124 may perform a function of a flash translation layer (FTL). The processor 124 may translate a logical block address provided by an external device into a physical block address through a flash translation layer (FTL). The flash translation layer may receive a logical block address and translate it into a physical block address using a mapping table.

There are various address mapping methods which may be employed by the flash translation layer according to the mapping unit. Typical address mapping methods include a page mapping method, a block mapping method, and a hybrid mapping method.

The processor 124 may randomize data received from an external device. For example, the processor 124 may randomize data received from an external device using a set randomizing seed. The randomized data may be provided to the memory 110 and programmed in the memory 110.

The processor 124 may derandomize data received from the memory 110 during a read operation. For example, the processor 124 may derandomize data received from the memory 110 using a derandomizing seed. The derandomized data may be output to an external device.

The processor 124 may perform background functions for the memory 110 such as a garbage collection (GC), a wear leveling (WL), and a bad block management.

The processor 124 may control the operation of the controller 120 by executing firmware. The processor 124 may control overall operations of the controller 120 and execute (drive) firmware stored in the working memory 125 during booting. In an embodiment, an operation of the storage device 100 may be implemented in a way the processor 124 executes firmware in which the corresponding operation is defined.

Firmware is a program being executed in the storage device 100 to drive the storage device 100 and may include various functional layers. For example, the firmware may include binary data in which codes for executing each of the above-mentioned functional layers are defined.

For example, the firmware may include a flash translation layer that performs a translation function between a logical block address transmitted from an external device to the storage device 100 and a physical block address of the memory 110, and a host interface layer (HIL) that receives and translates a command from the external device through the host interface 121 and delivers it to the flash translation layer, and a flash interface layer (FIL) that delivers a command instructed by the flash translation layer to the memory 110.

In an embodiment, the firmware may include a garbage collection function, a wear leveling function, and a bad block management function.

Such firmware, for example, may be loaded into the working memory 125 from the memory 110 or a separate non-volatile memory (e.g., ROM, NOR Flash) located outside the memory 110. When executing a booting operation after power is turned on, the processor 124 may first load all or part of the firmware into the working memory 125.

The processor 124 may perform logic operations defined in firmware loaded into the working memory 125 to control the overall operations of the controller 120. The processor 124 may store, in the working memory 125, a result of performing a logic operation defined in the firmware. The processor 124 may control the controller 120 to generate a command or signal according to a result of performing a logic operation defined in the firmware. When part of the firmware in which a logical operation to be performed is defined is not loaded into the working memory 125, the processor 124 may generate an event (e.g., interrupt) for loading the corresponding part of the firmware into the working memory 125.

The processor 124 may load meta data required to drive the firmware from the memory 110. Meta data is data for managing the memory 110 and may include management information about user data stored in the memory 110.

The firmware may be updated while the storage device 100 is being produced or while the storage device 100 is running. The controller 120 may download new firmware from an external device of the storage device 100 and update the existing firmware to new firmware.

The working memory 125 may store firmware, program codes, commands, or pieces of data necessary to drive the memory controller 120. The working memory 125 may include at least one or more among, for example, a static RAM (SRAM), a dynamic RAM (DRAM), and/or a synchronous RAM (SDRAM) as a volatile memory.

The error detection/correction circuit 126 may be configured to detect error bits of target data using an error correction code, and to correct the detected error bit(s). For example, the target data may be data stored in the working memory 125, data read from the memory 110, or the like.

The error detection/correction circuit 126 may be implemented to decode data using the error correction code. The error detection/correction circuit 126 may be implemented using various decoders. For example, the error detection/correction circuit 126 may be implemented with a decoder that performs nonsystematic code decoding or a decoder that performs systematic code decoding.

For example, the error detection/correction circuit 126 may detect error bit(s), sector by sector, with regard to each piece of read data. That is, each piece of read data may include multiple sectors. A sector may refer to a data unit less than the read unit (i.e., page) of a flash memory. Sectors constituting each piece of read data may correspond to each other via an address.

The error detection/correction circuit 126 may calculate a bit error rate (BER) and determine whether or not correction can be made sector by sector. For example, if the BER is greater than a reference value, the error detection/correction circuit 126 may determine that the corresponding sector is uncorrectable or "a fail". If the BER is less than the reference value, the error detection/correction circuit 126 may determine that the corresponding sector is correctable or "a pass".

The error detection/correction circuit 126 may perform error detection and correction operations successively with regard to all pieces of read data. When a sector in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

A bus 127 may be configured to provide a channel between the constituent elements 121, 122, 124, 125, and 126 of the memory controller 120. The bus 127 may include, for example, a control bus for delivering various types of control signals and commands, and a data bus for delivering various types of data.

Some of the elements of the above-mentioned constituent elements 121, 122, 124, 125, and 126 of the controller 120 may be omitted, or some of these elements may be integrated into a single element. In an embodiment, the memory controller 120 may also contain one or more other elements in addition to the elements identified above.

The processor 124 may store telemetry log data in a designated region of the working memory 125.

According to an embodiment, the telemetry log data may be data related to an event that requires logging on operational information of the processor 124 and is determined to be helpful for later debugging, such as booting completion, sudden power loss (SPL) occurrence, error occurrence, a command received from a host, input/output error occurrence, start and end of reset, occurrence of event related to working memory 125, erase/program/read failures, threshold voltage distribution characteristics, memory deterioration characteristics, defect maps, and the like. In addition to the events mentioned above, telemetry log data may include data related to all events required for debugging.

In particular, the telemetry log data may include log information of an internal device of the controller 120, especially processor 124. During debugging, this log information may serve as an important index for understanding a situation and scenario at the time that an event is occurred.

The processor 124 may store telemetry log data and transmit all or part of the telemetry log data to the external device when requested by the external device or periodically.

Figure 2A:
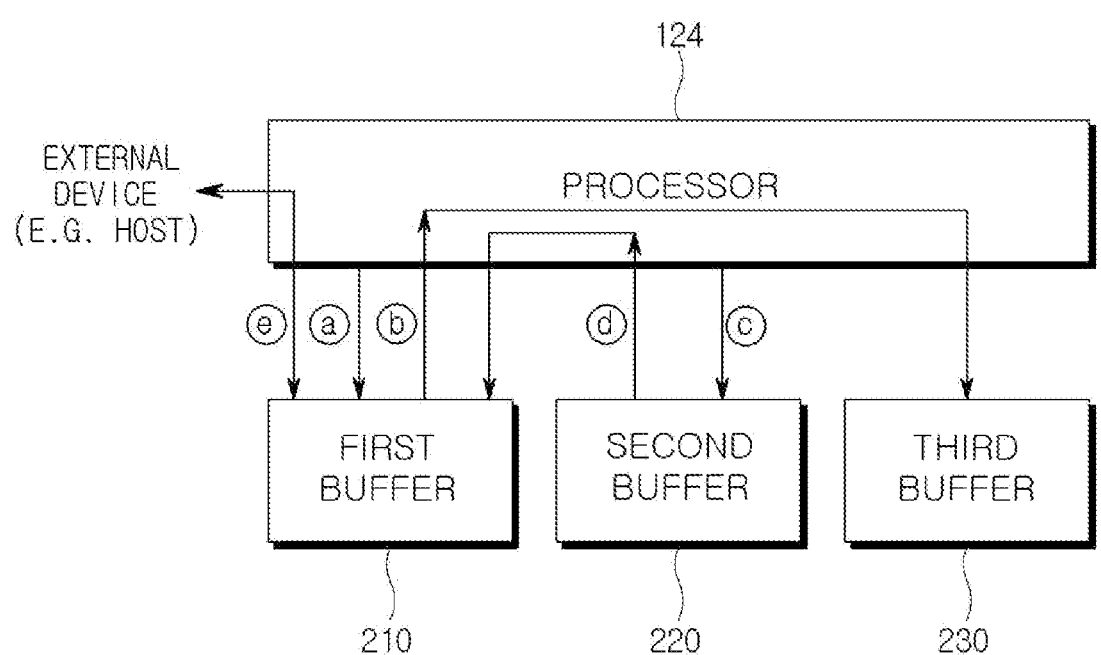
FIG. 2A is a diagram illustrating a memory structure for a processor to store telemetry log data according to various embodiments of the present disclosure.
Figure 2B:
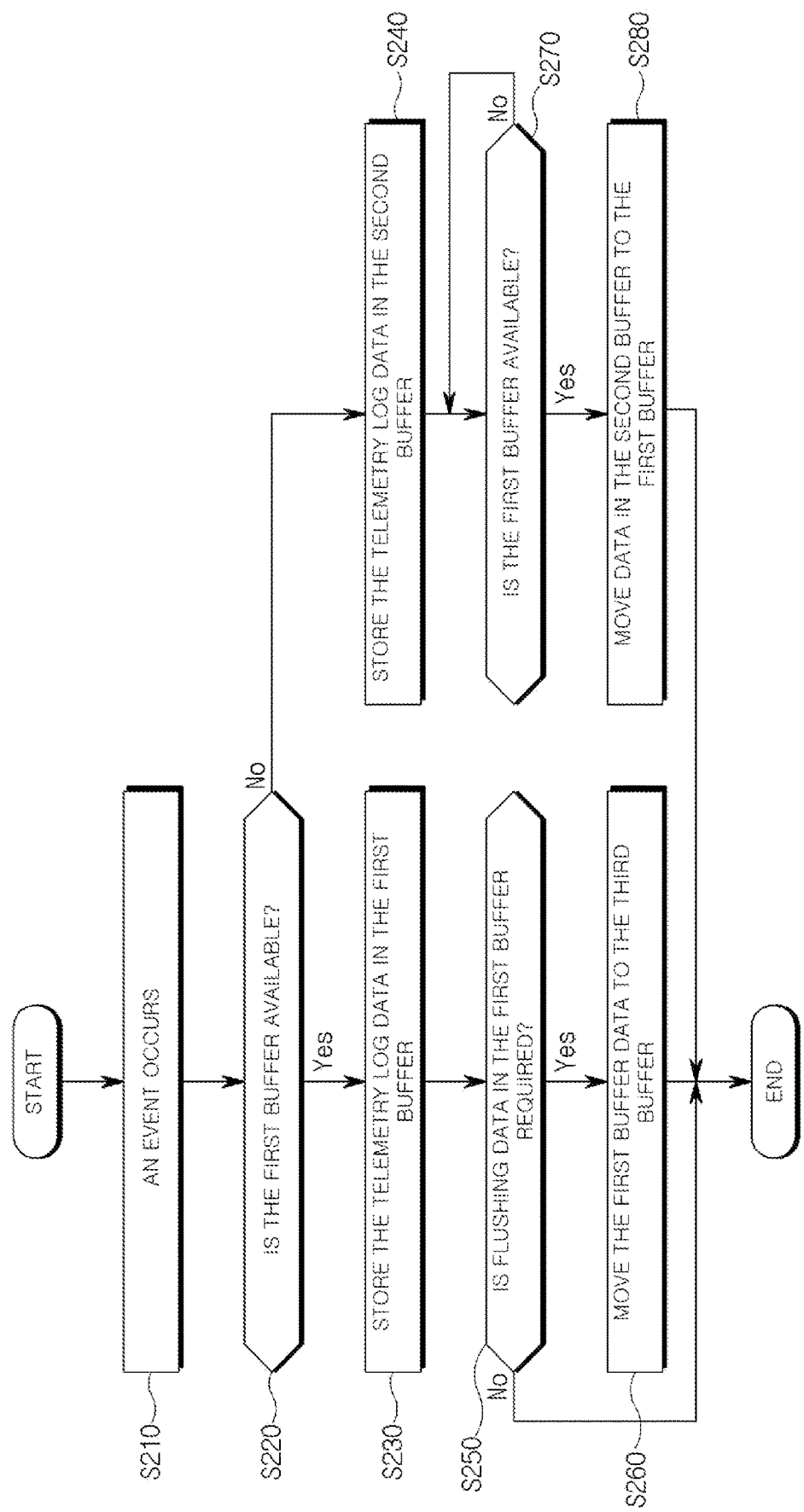
FIG. 2B is a flowchart illustrating an operation of a processor storing telemetry log data in the memory structure of FIG. 2A according to various embodiments of the present disclosure.

FIG. 2A is a diagram illustrating a memory structure for the processor 124 to store telemetry log data according to various embodiments of the present disclosure, and FIG. 2B is a flowchart illustrating an operation of the processor 124 storing telemetry log data in the memory structure of FIG. 2A according to various embodiments of the present disclosure.

Referring to FIG. 2A, the storage device 100 may use three buffers, i.e., a first buffer 210, a second buffer 220, and a third buffer 230, to store telemetry log data. In an embodiment, the first buffer 210 and the second buffer 220 may be part of the working memory 125. According to an embodiment, the first buffer 210 may use an SRAM having a high storage speed but relatively expensive unit price, and the second buffer 220 may use a DRAM having a low storage speed but relatively low unit price. In an embodiment, the third buffer 230 may be a non-volatile memory, which may be a part of the memory 110 according to an embodiment. However, if not limited thereto, the third buffer 230 may be a non-volatile memory provided separately from the memory 110.

Referring to FIGS. 2A and 2B, if an event requiring to store telemetry log data occurs in an operation S210, the processor 124 may determine whether the first buffer 210 is available or not, or whether telemetry log data can be stored at the first buffer 210, in the operation S220. If the processor 124 determines that the first buffer 210 is available in S220, the processor 124 may store the telemetry log data related to the corresponding event in the first buffer 210 (ⓐ) in an operation S230. If the processor 124 determines that the first buffer 210 is not available in S220, in an operation S240, the processor 124 may store the telemetry log data related to the corresponding event in the second buffer 220 (ⓒ).

According to the embodiment, if the first buffer 210 is completely filled with telemetry log data or the telemetry log data stored in the first buffer 210 is being moved to the third buffer 230, the processor 124 may determine that the telemetry log data cannot be stored in the first buffer 210.

In an operation S250, the processor 124 may determine whether it is necessary to move (or flush) the telemetry log data stored in the first buffer 210 to the third buffer. For example, when the first buffer 210 is completely filled with telemetry log data or filled with telemetry log data by a preset size, the processor 124 may determine that there is a need to move the telemetry log data stored in the first buffer 210 to the third buffer 230.

If the processor 124 determines that it is necessary to move the telemetry log data stored in the first buffer 210 to the third buffer 230, the processor 124 may move the telemetry log data stored in the first buffer 210 to the third buffer 230 (ⓑ) in an operation S260.

As described above, the processor 124 may determine that data may not be stored in the first buffer 210 while moving the telemetry log data of the first buffer 210 to the third buffer 230 (ⓑ). Accordingly, the processor 124 may store the telemetry log data generated according to the occurrence of the event in the second buffer 220 (ⓒ) in the operation S240.

According to the embodiment, if the processor 124 has stored the telemetry log data temporarily in the second buffer 220 in the operation S240, the processor 124 may determine whether the data can be stored in the first buffer in an operation S270. As a result of what is determined in the operation S270, if it is possible to store data in the first buffer 210, for example, if moving the telemetry log data from the first buffer 210 to the third buffer 230 (ⓑ) is completed, the processor 124 may move the telemetry log data stored in the second buffer 220 to the first buffer 210 (ⓓ) in S280. For example, the telemetry log data temporarily stored in the second buffer 220, e.g., DRAM, may be moved to and stored in the first buffer 210, e.g., SRAM.

According to the embodiment, the processor 124 may perform an operation of determining whether the data can be stored in the first buffer 210 in the operation S270 independently of various operations illustrated in FIG. 2B. For example, if the processor 124 determines that the telemetry log data is stored in the second buffer by the operation S240, the processor 124 may periodically perform the operation S270. Then, as a result of what is determined in the operation S270, if it is possible to store data in the first buffer 210, the processor 124 may move the telemetry log data stored in the second buffer 220 to the first buffer 210 (ⓓ) in an operation S280.

According to another embodiment, the processor 124 may determine that it is possible to store the telemetry log data in the first buffer 210 in the determination of the operation S220 after the event of the operation S210 occurs. Then, if the telemetry log data is stored in the second buffer 220, the processor 124 may first execute an operation of moving the telemetry log data in the second buffer 220 to the first buffer 210 (ⓓ) in the operation S280, and next, may store the telemetry log data generated by the occurrence of the event in the operation S210 to the first buffer 210 (ⓐ) in the operation S230.

Based on the above operation, the processor 124 may use the first buffer 210 as a main buffer for storing the telemetry log data, and use the second buffer 220 as a temporary buffer used only when moving the telemetry log data in the first buffer 210.

When the processor 124 receives a request of transmitting the telemetry log data from an external device (e.g., a host), the processor 124 may transmit the telemetry log data stored in the first buffer 210 to the external device (ⓔ).

According to the embodiment, when there is an error in data read from the storage device 100 or an error occurs during program code execution, the external device may send a telemetry read command (e.g., a Get Log Page command which has a log identifier of 07) to the storage device 100 to request the telemetry log data, and may perform debugging based on the acquired telemetry log data. As such, the telemetry log data stored in the storage device 100 may be used as data for debugging by an external device. According to the embodiment, when information required for debugging is not obtained from the acquired telemetry log data, the external device may read the past telemetry log data stored in the third buffer 230. In this case, using a general non-volatile memory read command (e.g., NVMe-MI Receive Command Request Message) rather than a telemetry read command, the external device may obtain the past telemetry log data stored in the third buffer 230.

According to the embodiment, when data necessary for debugging is stored in the first buffer 210, an additional read operation of an external device is not required, so the time required for debugging can be reduced. In addition, if there is a lot of telemetry log data stored in the first buffer 210, it may take a lot of time for the external device to read the telemetry log data stored in the first buffer 210 and to find data necessary for debugging, thus the time being consumed for debugging may increase. That is, if a lot of telemetry log data is stored in the first buffer 210 and flushed to the third buffer 230, data necessary for debugging may be included in the telemetry log data stored in the first buffer 210, but the external device spends a lot of time searching for the corresponding data. In contrast, if relatively little telemetry log data is stored in the first buffer 210 and then flushed to the third buffer 230, data necessary for debugging may not be stored in the first buffer 210, and so much time may be spent reading data stored in the third buffer 230.

Accordingly, an optimal amount of telemetry log data can be stored in the first buffer 210. Therefore, according to various embodiments of the present disclosure, the processor 124 may set the size of telemetry log data to be stored in the first buffer 210 to an optimal amount.

According to the embodiment, the bigger a rising momentum or a rising rate of the telemetry log data accumulated is and the bigger the size of the telemetry log data stored in the first buffer 210 for the last N hours is, the processor 124 may increase the size of the first buffer 210 to be maintained until the data stored at the first buffer 210 is flushed to the third buffer 230. Here, the flush may be moving the telemetry log data stored in the first buffer 210 to the third buffer 230.

According to the embodiment, the processor 124 may flush the first buffer 210 when the size of the telemetry log data stored in the first buffer 210 is greater than or equal to the threshold size. Based on the size of the telemetry log data stored in the first buffer 210 during a certain period of time or the number of telemetry logs corresponding thereto, the processor 124 may set the threshold size to a value obtained by an equation: "(the number of telemetry logs accumulated during the last certain period of time/a maximum number of telemetry logs that can be stored in the first buffer 210)×the size of the first buffer 210" (i.e., first set value).

In an embodiment, the processor 124 may adjust the threshold size based on the accumulating rising momentum. In an embodiment, the adjusted value may be set to a value obtained by an equation: "(the number of telemetry logs stored for the last N hours–the number of telemetry logs stored for the previous N hours)/a maximum number of telemetry logs that can be stored in the first buffer 210)×the size of the first buffer 210)×a rising momentum parameter" (i.e., second set value). In an embodiment, the rising momentum parameter may be a parameter for determining how much to reflect the rising momentum factor in determining the threshold size.

Accordingly, the processor 124 may set the threshold size in various ways. The threshold size may be set to the first set value, the threshold size may be set to the sum of the first set value and the second set value, or the threshold size may be set to the sum of the previous threshold size and the second set value.

When the size of the telemetry log data stored in the first buffer 210 is greater than or equal to the threshold size, the processor 124 may perform a flush (or move) the data stored in the first buffer 210 to the third buffer 230.

Figure 3:
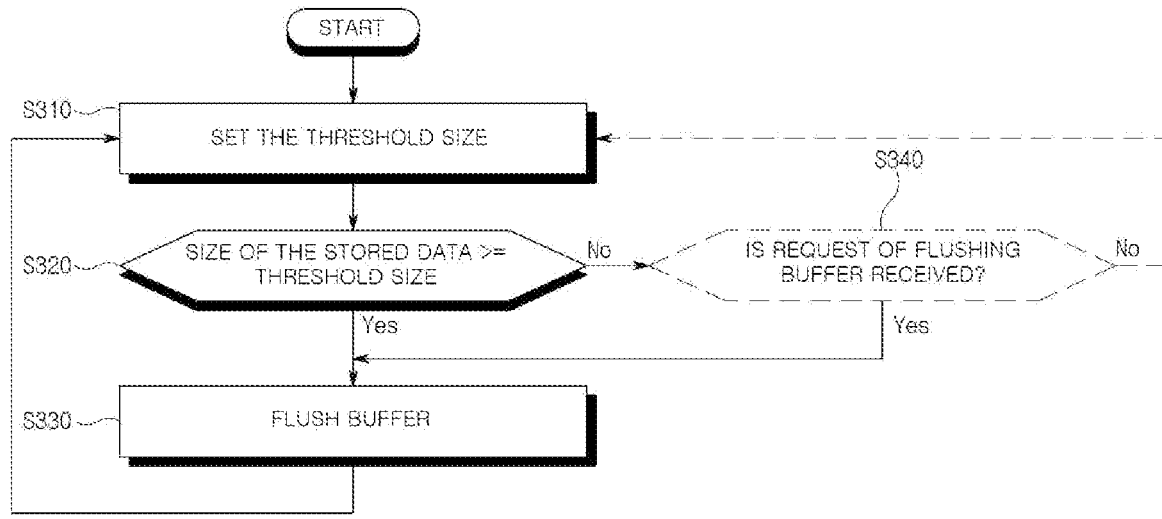
FIG. 3 is a flowchart illustrating operations for a processor to store telemetry log data according to various embodiments of the present disclosure.

FIG. 3 is a flowchart illustrating operations for the processor 124 to store the telemetry log data.

Referring to FIG. 3, in an operation S310, the processor 124 may set the threshold size of the telemetry log data to be stored in the first buffer 210. According to the embodiment, the processor 124 may set the initial value of the threshold size to an arbitrary value. For example, the processor 124 may set the threshold size to the entire size of the first buffer 210. Alternatively, the processor 124 may set the threshold size to a half of the size of the first buffer 210.

In an operation S320, the processor 124 may determine whether the size of the telemetry log data stored in the first buffer 210 is greater than or equal to the threshold size. If the size of the telemetry log data stored in the first buffer 210 is greater than or equal to the threshold size, the processor 124 may flush the first buffer 210 in an operation S330. That is, the processor 124 may move the telemetry log data stored in the first buffer 210 to the third buffer 230. Then, returning to the operation S310, the processor 124 may reset the threshold size.

In the operation S320, if the size of the telemetry log data stored in the first buffer 210 is less than the threshold size, the processor 124 may determine whether a buffer flush request is received from the external device 150 in an operation S340. In an embodiment, the buffer flush request may be requested by the external device 150 to the storage device 100 arbitrarily according to its own needs. For example, when the external device 150 intends to flush the telemetry log data stored so far in order to perform new debugging, the external device 150 may transmit a buffer flush request to the storage device 100. If a buffer flush request is received, the processor 124 may flush the first buffer 210 in the operation S330.

According to the embodiment, the processor 124 may perform the operation S310 and the operations S320 to S340 as separate and independent operations. The processor 124 may perform the threshold size setting in the operation S310 whenever the first buffer 210 is flushed or in regular cycles regardless of the buffer flushing. Apart from that, the processor 124 may perform the operation S320 whenever an event occurs in which the size of the stored data is changed or may perform the operation S320 in regular cycles. In addition, the processor 124 may immediately perform the operation S340 when a corresponding event is detected, or may check whether there is a corresponding event to perform the operation S340 in regular cycles. That is, the processor 124 may perform the operation S320 and operation S340 as separate and independent operations. According to another embodiment, the processor 124 may check the operation S340 first and then check the operation S320.

Figure 4:
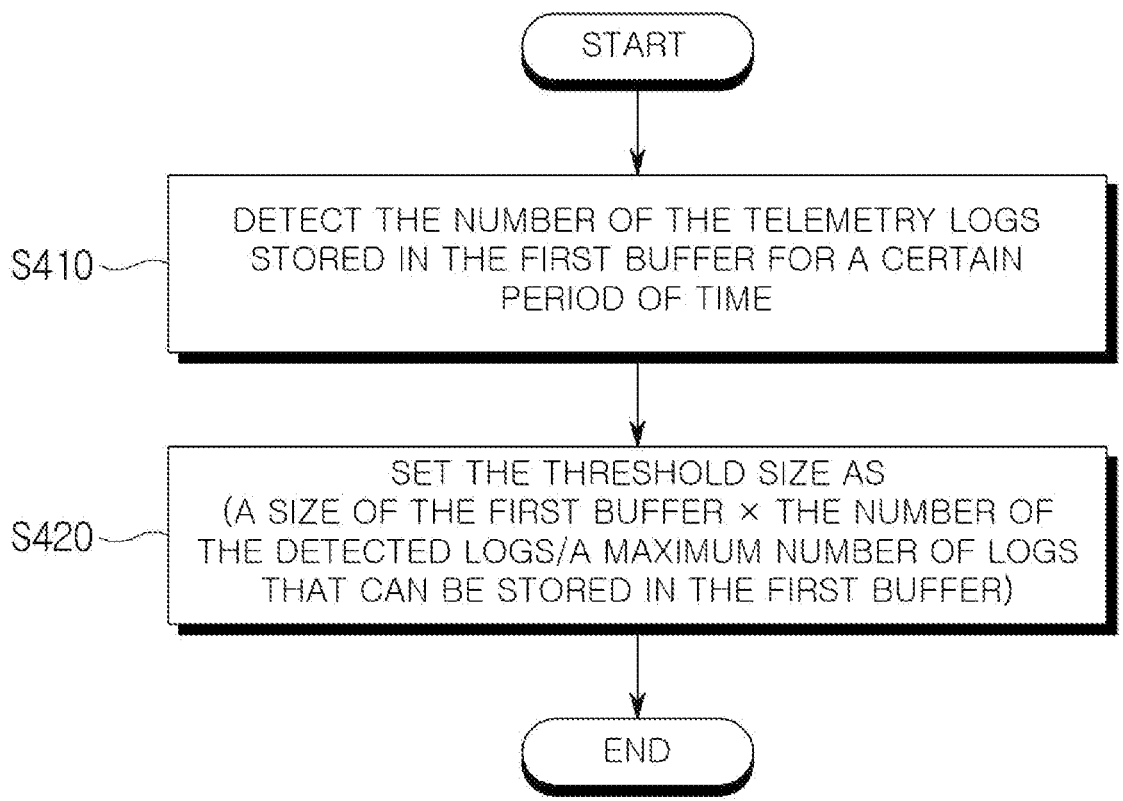
FIG. 4 is a flowchart illustrating a method of setting a threshold size according to various embodiments of the present disclosure.

FIG. 4 is a flowchart illustrating a method of setting a threshold size according to various embodiments of the present disclosure.

Referring to FIG. 4, in an operation S410, the processor 124 may detect the number of telemetry logs stored in the first buffer 210 for a certain period of time. In an operation S420, based on the number of telemetry logs detected in the operation 410, the processor 124 may set the threshold size, as a first set value, to a value obtained by an equation: a size of the first buffer 210×the number of the detected telemetry logs/a maximum number of telemetry logs that can be stored in the first buffer 210.

Figure 5:
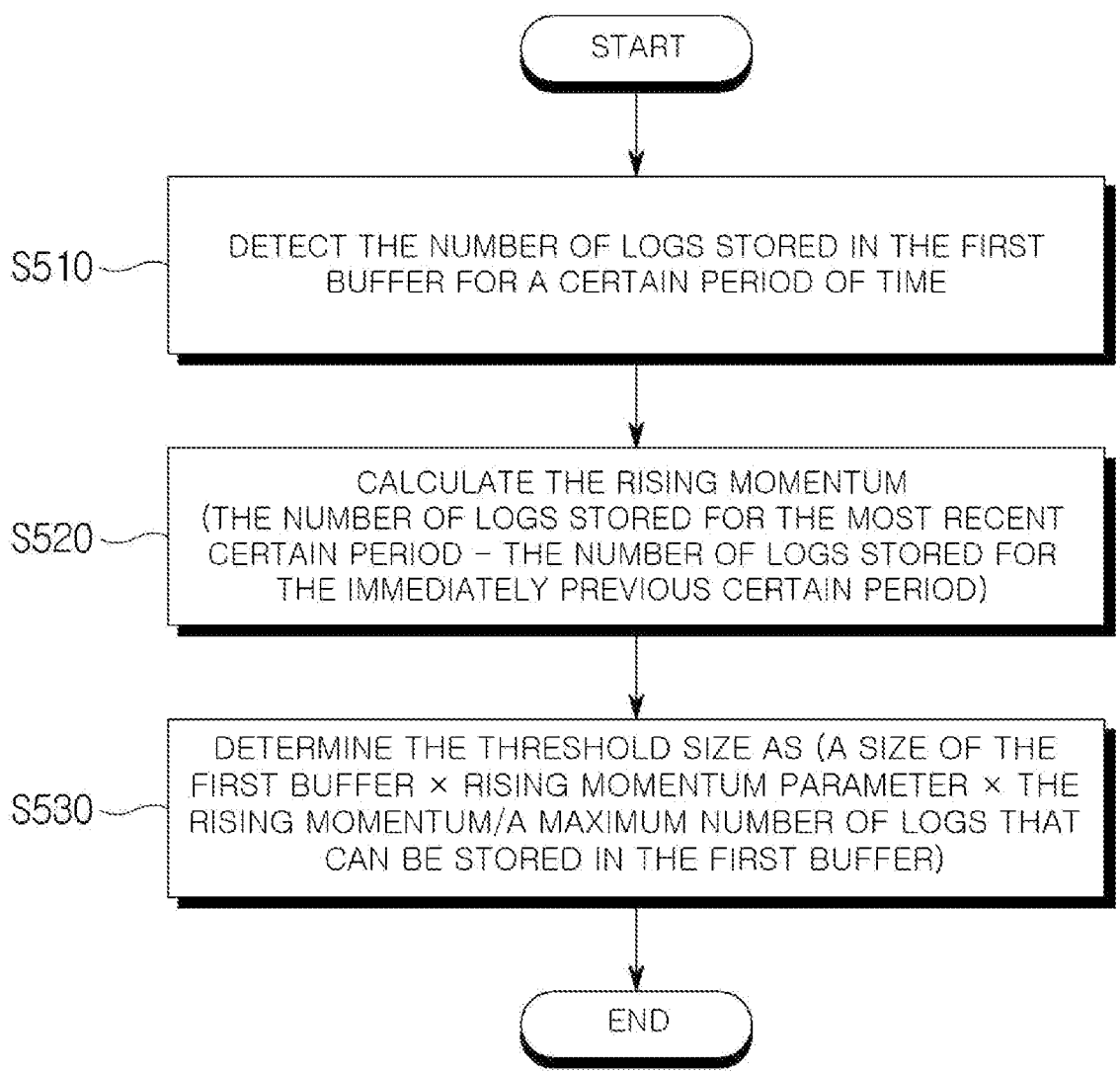
FIG. 5 is a flowchart illustrating an additional method of setting a threshold size according to various embodiments of the present disclosure.

FIG. 5 is a flowchart illustrating an additional method of setting the threshold size according to various embodiments of the present disclosure.

Referring to FIG. 5, in an operation S510, the processor 124 may detect the number of telemetry logs stored in the first buffer 210 for a certain period of time. According to the embodiment, the processor 124 may detect and store the number of telemetry logs stored in the first buffer 210 in cycles of a certain time. According to the embodiment, the processor 124 may store the number of telemetry logs in the current cycle and the number of telemetry logs in the immediately previous cycle prior to the current cycle.

The processor 124 may calculate the rising momentum in an operation S520. According to the embodiment, the processor 124 may determine the gap between the number of telemetry logs stored for the most recent certain period (i.e., the number of telemetry logs of the current cycle) and the number of telemetry logs stored for the immediately previous certain period (i.e., the number of telemetry logs of the immediately previous cycle) as the rising momentum. At this time, the rising momentum may be a negative integer or a positive integer. In the case where the rising momentum is a negative integer, the processor 124 may make a threshold size to be less than the previous threshold size. In the case where the rising momentum is a positive integer, the processor 124 may make a threshold size to be greater than the previous threshold size. According to the embodiment, in an operation S530, based on the rising momentum calculated in the operation 520, the processor 124 may determine the threshold size, as a second set value, to a value obtained by an equation: a size of the first buffer 210×a rising momentum parameter×the rising momentum/a maximum number of telemetry logs that can be stored in the first buffer 210).

According to the embodiment, the processor 124 may determine a new threshold size by adding the second set value to the first set value determined according to FIG. 4 or adding the second set value to the previous threshold size.

Embodiments of the present disclosure propose a method for dynamically determining the size of telemetry log data to be reported to an external device. Accordingly, it is possible to dynamically determine the optimal size of the telemetry log data stored in the volatile memory of the storage device, and accordingly, the optimal telemetry log data is delivered to the external device, thereby facilitating the external device to easily determine problems during debugging.

What is claimed is:

1. A memory controller, comprising:
a first interface configured to perform data communication with a first external device;
a second interface configured to generate a signal for controlling an operation of a second external device;
a first volatile memory buffer configured to store telemetry log data; and
a processor configured to:
generate and store the telemetry log data in the first volatile memory buffer;
move and store the telemetry log data stored in the first volatile memory buffer to a first non-volatile memory buffer, when a size of the telemetry log data stored in the first volatile memory buffer is greater than or equal to a threshold size; and
set the threshold size based on at least one among a number of telemetry logs stored in the first volatile memory buffer and a rising momentum of the number of the telemetry logs,
wherein the processor is further configured to:
obtain a number of telemetry logs stored in the first volatile memory buffer at predetermined time intervals;
determine a first set value by an equation: (a size of the first volatile memory buffer)×(the stored number of the telemetry logs)/(a maximum number of telemetry logs storable in the first volatile memory buffer); and
set the threshold size as the first set value.

2. The memory controller of claim 1, further comprising:
a second volatile memory buffer,
wherein, when the processor cannot store the telemetry log data in the first volatile memory buffer, the processor temporarily stores the telemetry log data in the second volatile memory buffer.

3. The memory controller of claim 2,
wherein the processor moves the telemetry log data temporarily stored in the second volatile memory buffer to the first volatile memory buffer when the telemetry log data can be stored in the first volatile memory buffer.

4. The memory controller of claim 2,
wherein the first volatile memory buffer is configured as a static random access memory (SRAM), and
the second volatile memory buffer is configured as a dynamic random access memory (DRAM).

5. The memory controller of claim 1,
wherein the processor is configured to set the threshold size by adding a second set value based on the rising momentum of the number of telemetry logs to the first set value, and
wherein the rising momentum is a value obtained by subtracting a number of telemetry logs stored in the first volatile memory buffer at a previous time interval from a number of telemetry logs stored in the first volatile memory buffer at a current time interval.

6. The memory controller of claim 5,
wherein the second set value is determined by an equation: a size of the first volatile memory buffer×the rising momentum×a rising momentum parameter/a maximum number of telemetry logs storable in the first volatile memory buffer.

7. The memory controller of claim 1,
wherein the processor is configured to:
obtain a number of telemetry logs stored in the first volatile memory buffer at predetermined time intervals; and
set the threshold size by adding a fourth set value based on the rising momentum of the number of telemetry logs to a previously set threshold size, and
wherein the rising momentum is a value obtained by subtracting a number of telemetry logs stored in the first volatile memory buffer at a previous time interval from a number of telemetry logs stored in the first volatile memory buffer at a current time interval.

8. The memory controller of claim 7,
wherein the fourth set value is determined by an equation: a size of the first volatile memory buffer×the rising momentum×a rising momentum parameter/a maximum number of telemetry logs storable in the first volatile memory buffer.

9. The memory controller of claim 1,
wherein the processor transmits the telemetry log data stored in the first volatile memory buffer to the first external device when receiving a telemetry read command from the first external device.

10. The memory controller of claim 9,
wherein the controller reads and transmits the telemetry log data stored in the first non-volatile memory buffer to the first external device when receiving a read command for the first non-volatile memory buffer from the first external device.

11. A storage device, comprising:
a memory including a non-volatile memory and configured to store data; and
a memory controller configured to generate a control signal for controlling the memory to write the data in or read the data from the memory,
wherein the memory controller comprises:
a first volatile memory buffer configured to store telemetry log data; and
a processor configured to:
  generate and store the telemetry log data in the first volatile memory buffer;
  move and store the telemetry log data stored in the first volatile memory buffer to the first non-volatile memory buffer when a size of the telemetry log data stored in the first volatile memory buffer is greater than or equal to a threshold size; and
  set the threshold size based on at least one among a number of telemetry logs stored in the first volatile memory buffer and a rising momentum of a number of telemetry logs,
wherein the processor is further configured to:
  obtain a number of telemetry logs stored in the first volatile memory buffer at predetermined time intervals;
  determine a first set value by an equation: (a size of the first volatile memory buffer)×(the stored number of the telemetry logs)/(a maximum number of telemetry logs storable in the first volatile memory buffer); and
  set the threshold size as the first set value.

12. The storage device of claim 11,
wherein the memory controller further comprises a second volatile memory buffer, and
wherein, when the processor cannot store the telemetry log data in the first volatile memory buffer, the processor temporarily stores the telemetry log data in the second volatile memory buffer.

13. The storage device of claim 12,
wherein the processor moves the telemetry log data temporarily stored in the second volatile memory buffer to the first volatile memory buffer when the telemetry log data can be stored in the first volatile memory buffer.

14. The storage device of claim 11,
wherein the processor is configured to set the threshold size by adding a second set value based on the rising momentum of the number of telemetry logs to the first set value,
wherein the second set value is determined by an equation: a size of the first volatile memory buffer×the rising momentum×a rising momentum parameter/a maximum number of telemetry logs storable in the first volatile memory buffer, and
wherein the rising momentum is a value obtained by subtracting a number of telemetry logs stored in the first volatile memory buffer at a previous time interval from a number of telemetry logs stored in the first volatile memory buffer for at a current time interval.

15. The storage device of claim 11,
wherein the processor is configured to:
  obtain a number of telemetry logs stored in the first volatile memory buffer at predetermined time intervals; and
  set the threshold size by adding a fourth set value based on the rising momentum of the number of telemetry logs to a previously set threshold size,
wherein the fourth set value is determined by an equation: the size of the first volatile memory buffer×the rising momentum×a rising momentum parameter/a maximum number of telemetry logs storable in the first volatile memory buffer, and
wherein the rising momentum is a value obtained by subtracting a number of telemetry logs stored in the first volatile memory buffer at a previous time interval from a number of telemetry logs stored in the first volatile memory buffer at a current time interval.

16. The storage device of claim 11,
wherein the processor transmits the telemetry log data stored in the first volatile memory buffer to an external device when receiving a telemetry read command from the external device, and
wherein the controller reads and transmits telemetry log data stored in the first non-volatile memory buffer to the first external device when receiving a read command for the first non-volatile memory buffer from the first external device.

17. A storage device comprising:
a memory including a non-volatile memory; and
a memory controller including a volatile memory and a processor configured to control the memory to write data in the memory or read the data from the memory,
wherein the processor is configured to:
determine whether an event occurs that requires storing telemetry log data;
when it is determined that the event occurred, generate the telemetry log data and store the telemetry log data in the volatile buffer;
determine whether a size of the stored telemetry log data exceeds a threshold size; and
when it is determined that the size of the stored telemetry log data exceeds the threshold size, flush the stored telemetry log data to the non-volatile buffer,
wherein the threshold size is determined by an equation: (a size of the volatile memory)×(a number of the telemetry logs stored in the volatile buffer for a first time period)/(a maximum number of telemetry logs capable of storing in the volatile memory).

* * * * *